US007127725B2

(12) United States Patent  
Lee

(10) Patent No.: US 7,127,725 B2  
(45) Date of Patent: Oct. 24, 2006

(54) DISC COLLATOR

(75) Inventor: John Scott Lee, Coon Rapids, MN (US)

(73) Assignee: Rimage Corporation, Minneapolis, MN (US)

( * ) Notice: Subject to any disclaimer, the term of this patent is extended or adjusted under 35 U.S.C. 154(b) by 79 days.

(21) Appl. No.: 10/256,240

(22) Filed: Sep. 25, 2002

(65) Prior Publication Data

US 2004/0057347 A1 Mar. 25, 2004

(51) Int. Cl.  
*G11B 17/03* (2006.01)

(52) U.S. Cl. .................................................. 720/600

(58) Field of Classification Search ............. 369/30.31, 369/30.32, 30.34, 30.36, 30.83, 30.85  
See application file for complete search history.

(56) References Cited

U.S. PATENT DOCUMENTS

| 4,571,645 A | 2/1986 | Johnson |
| 4,693,659 A | 9/1987 | Burke |
| 4,813,838 A | 3/1989 | Santeusanio |
| 5,031,060 A | 7/1991 | Ashby |
| 5,640,535 A * | 6/1997 | Suzuki et al. ............... 711/170 |
| 5,734,629 A | 3/1998 | Lee |
| 5,914,918 A * | 6/1999 | Lee et al. ................. 369/30.32 |
| 5,946,216 A * | 8/1999 | Hollerich .................... 700/223 |
| 6,321,649 B1 * | 11/2001 | Vangen et al. ................. 101/35 |
| 6,327,230 B1 * | 12/2001 | Miller et al. ............. 369/30.36 |
| 6,490,232 B1 * | 12/2002 | Sato ......................... 369/30.34 |
| 6,760,052 B1 * | 7/2004 | Cummins et al. ........... 347/171 |
| 6,822,932 B1 * | 11/2004 | Miller ...................... 369/30.31 |
| 2003/0002400 A1 * | 1/2003 | Klein ....................... 369/30.55 |

FOREIGN PATENT DOCUMENTS

| DE | 29521185 U | 9/1996 |
| EP | 0 799 710 A1 | 10/1997 |
| JP | 2002237104 A | 8/2002 |
| JP | 2002334552 A | 11/2002 |
| JP | 2002237104 A | 8/2003 |

* cited by examiner

*Primary Examiner*—Angel Castro  
(74) *Attorney, Agent, or Firm*—Leffert Jay & Polglaze, P.A.

(57) ABSTRACT

A disc collator includes a series of collating trays for collating multiple discs. A disc can be deposited in any one of a number of trays according to where a user desires the disc to be placed, allowing prompt and timely retrieval of CDs. Motion of the disc collating system picker arm may be along only one axis.

21 Claims, 10 Drawing Sheets

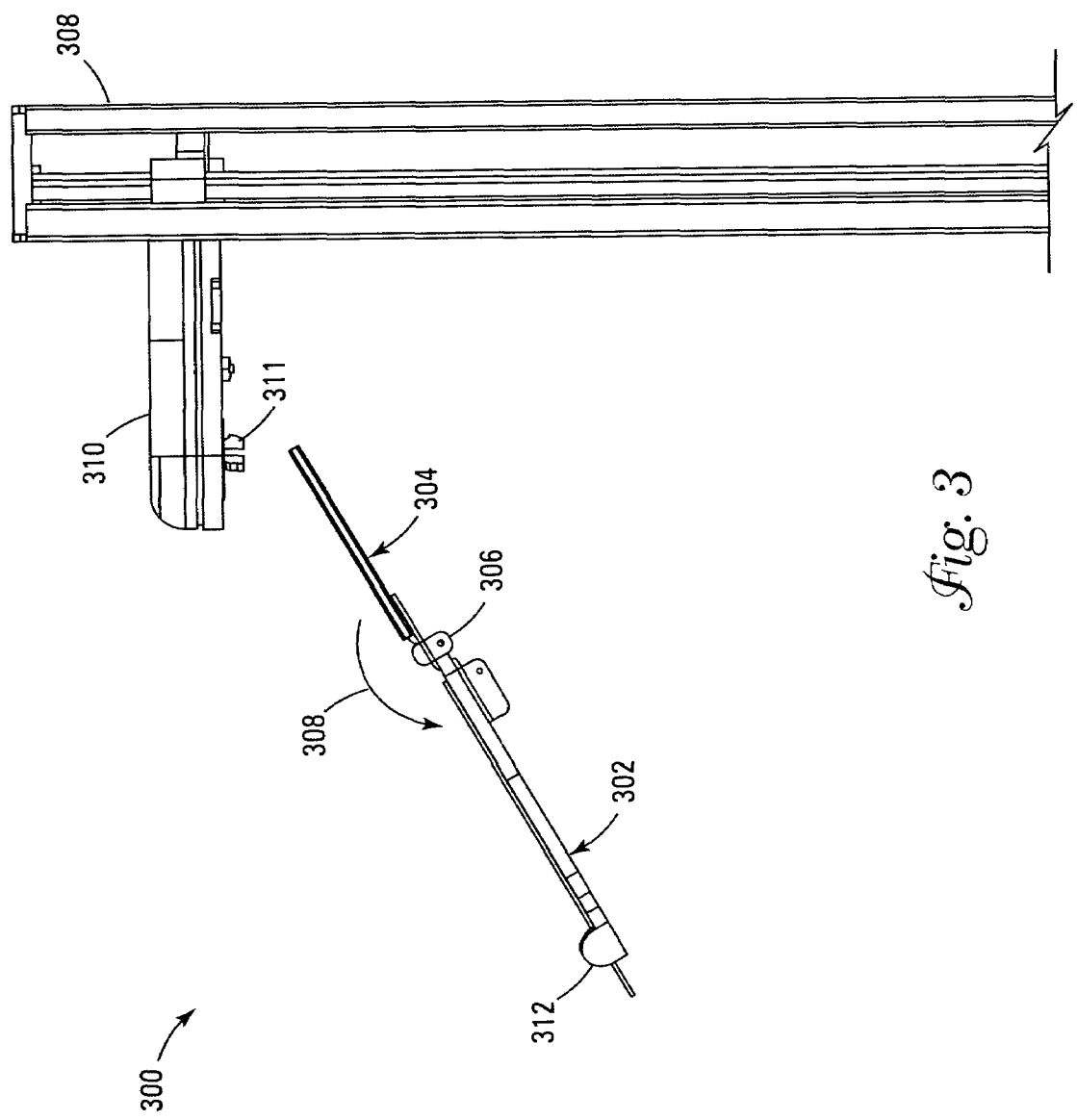

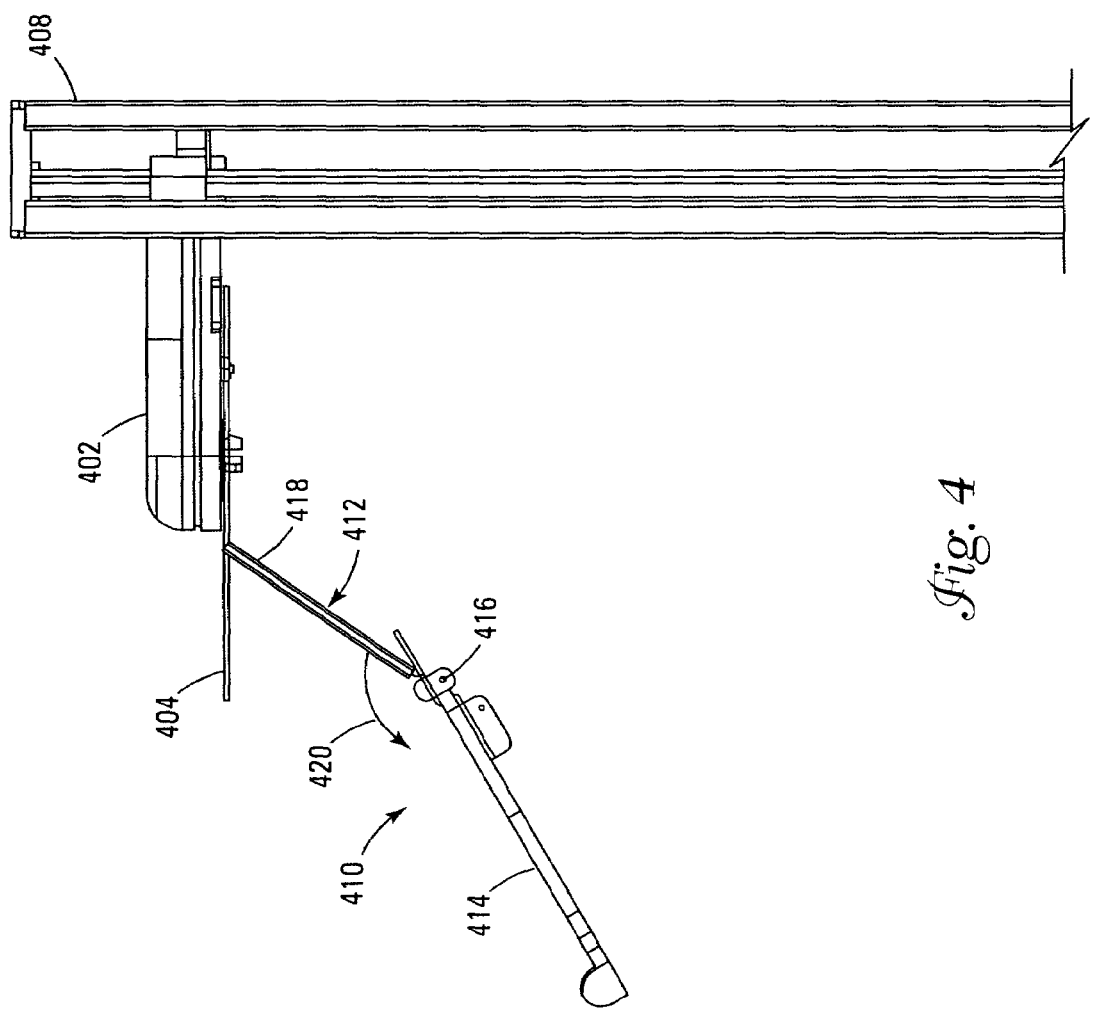

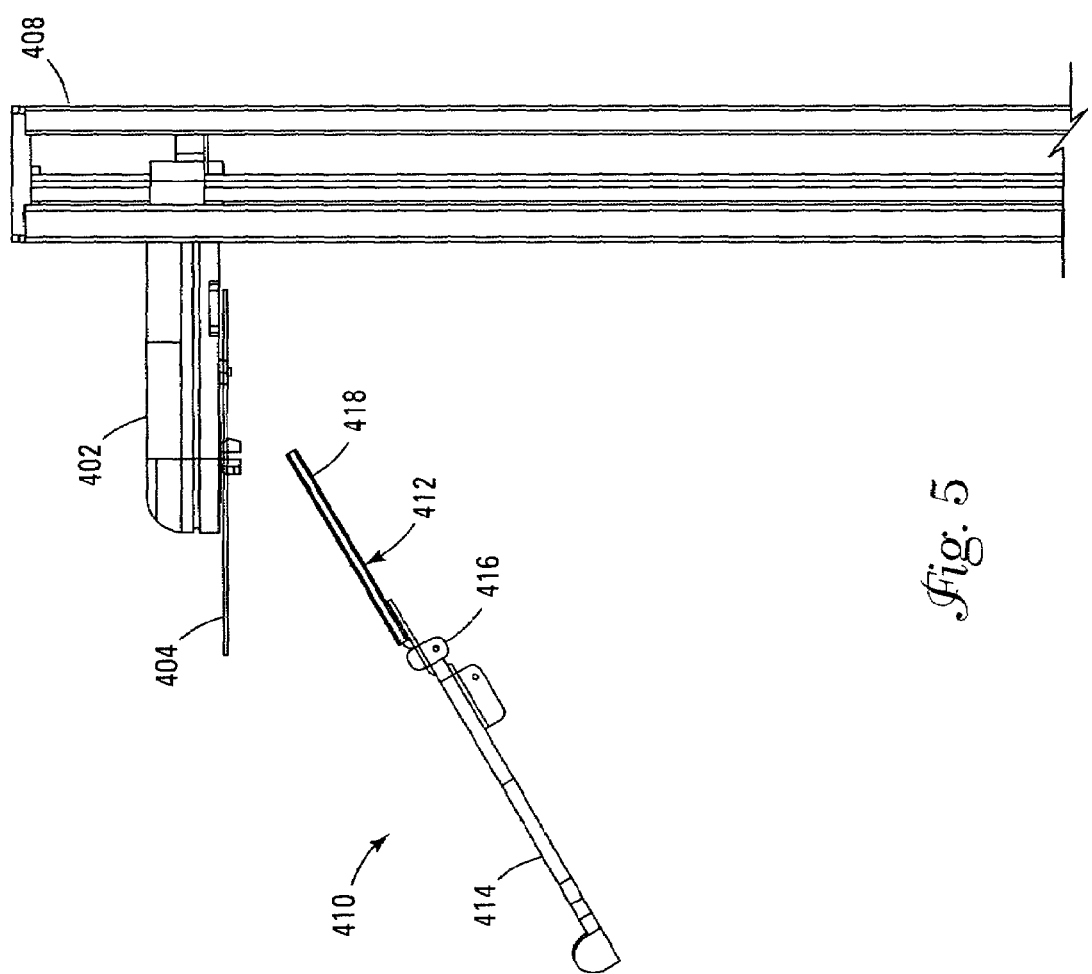

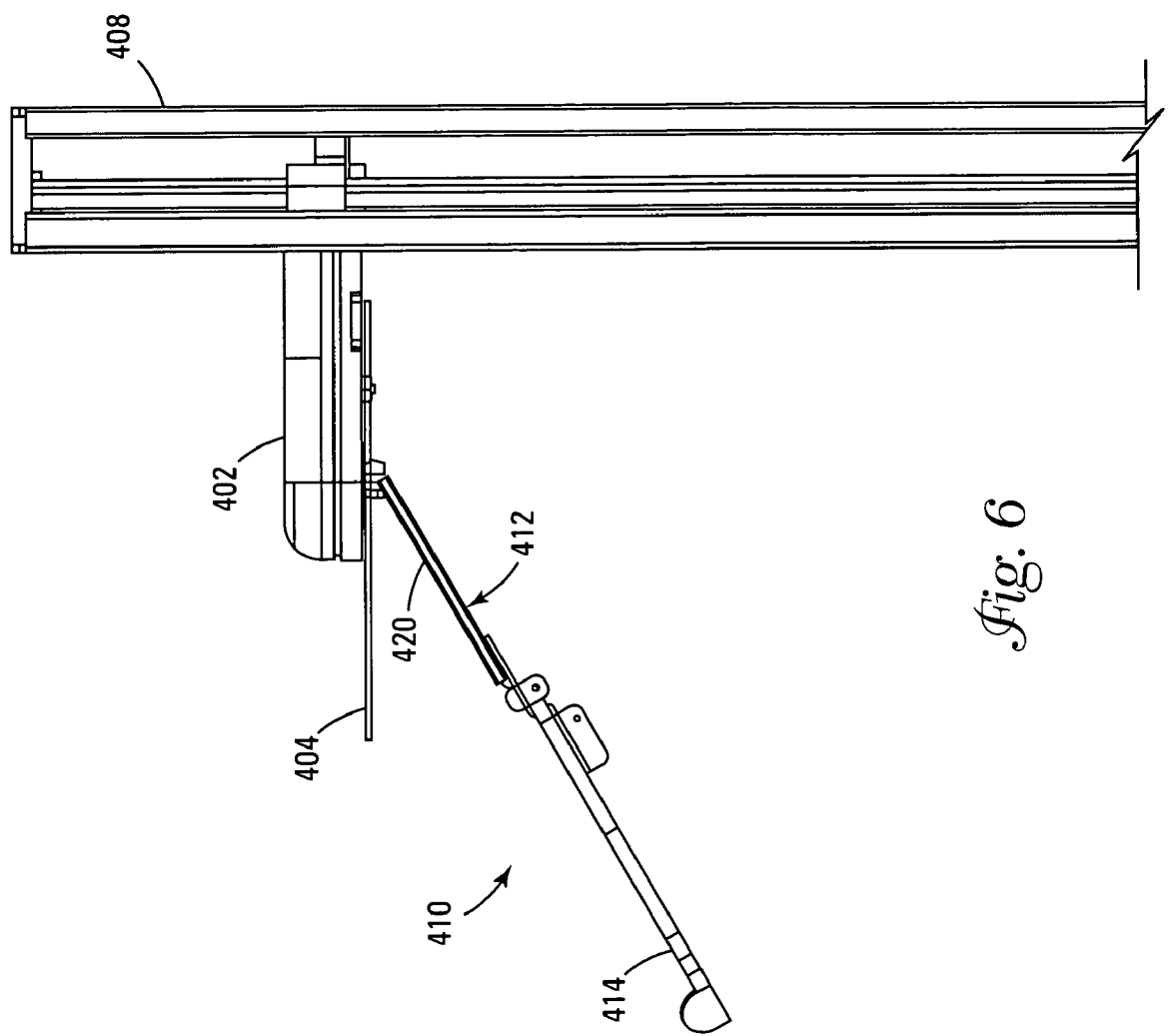

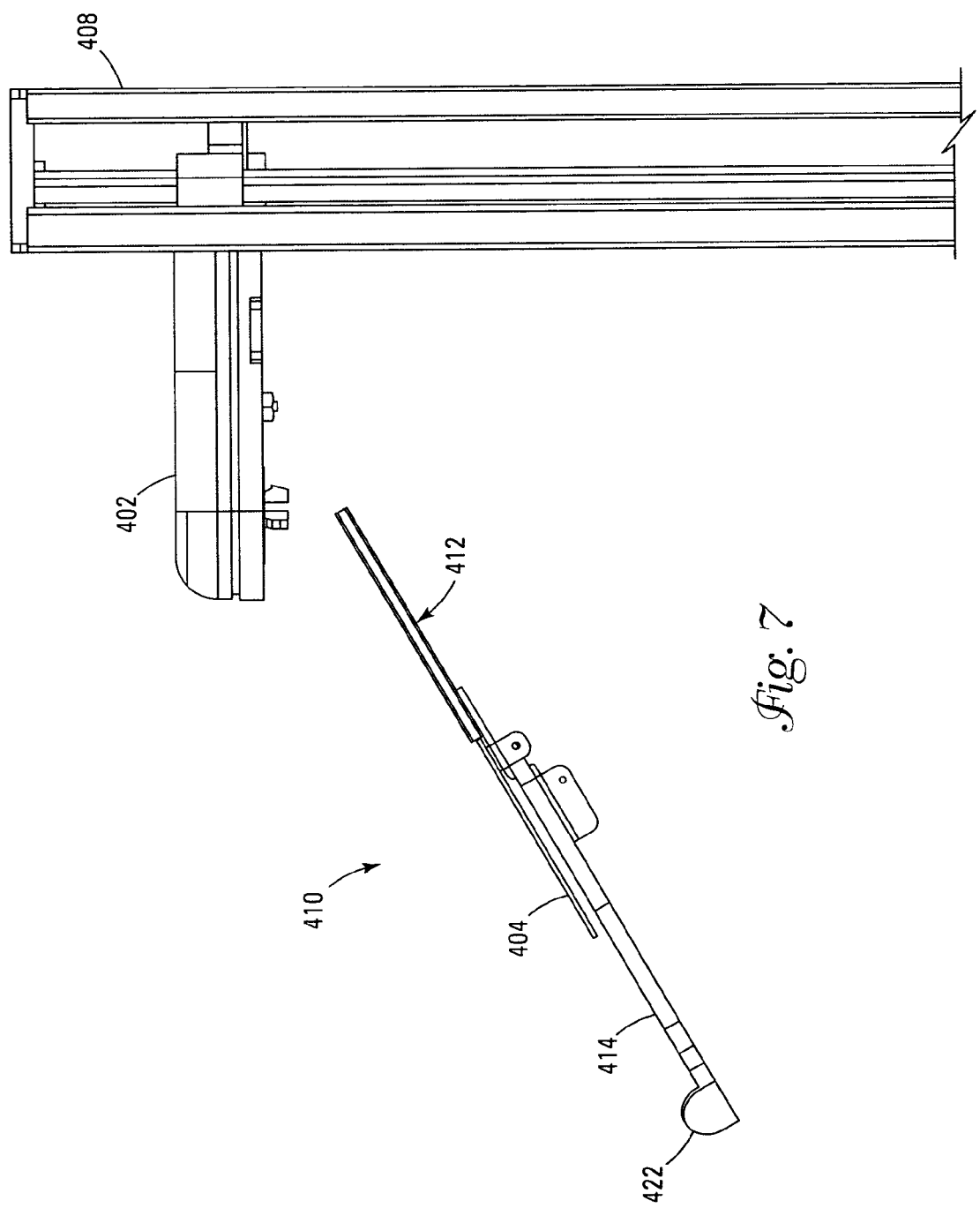

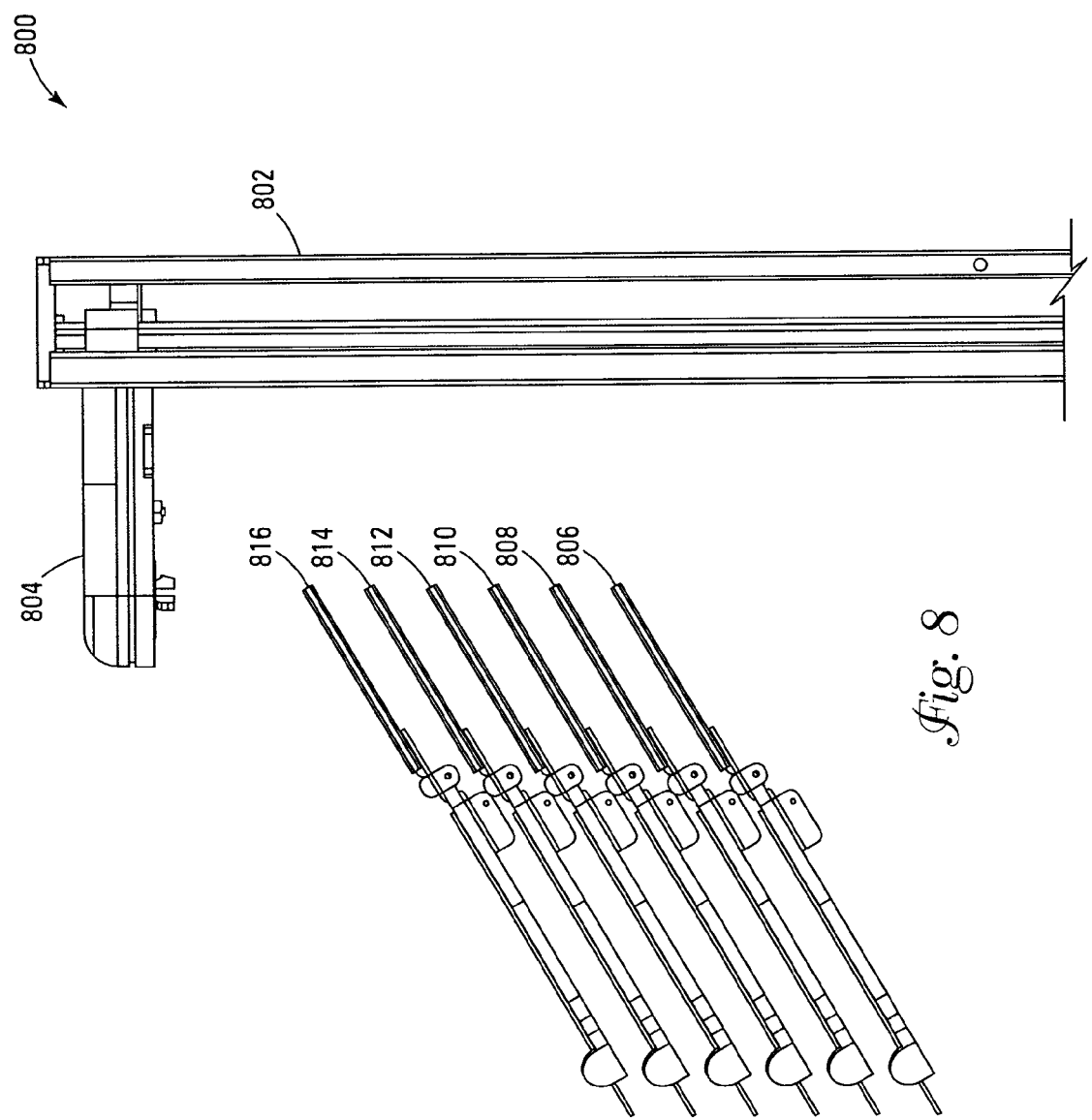

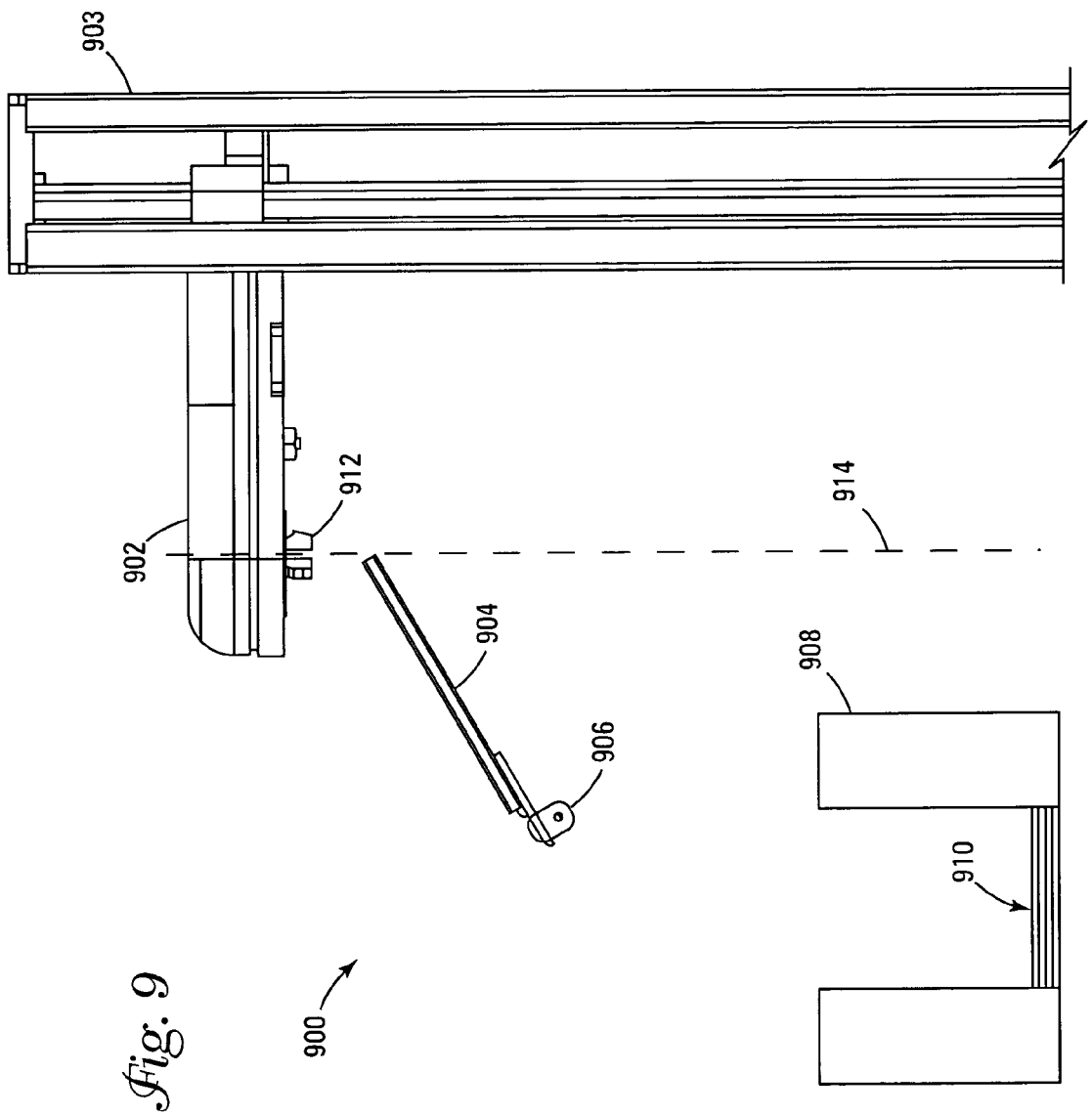

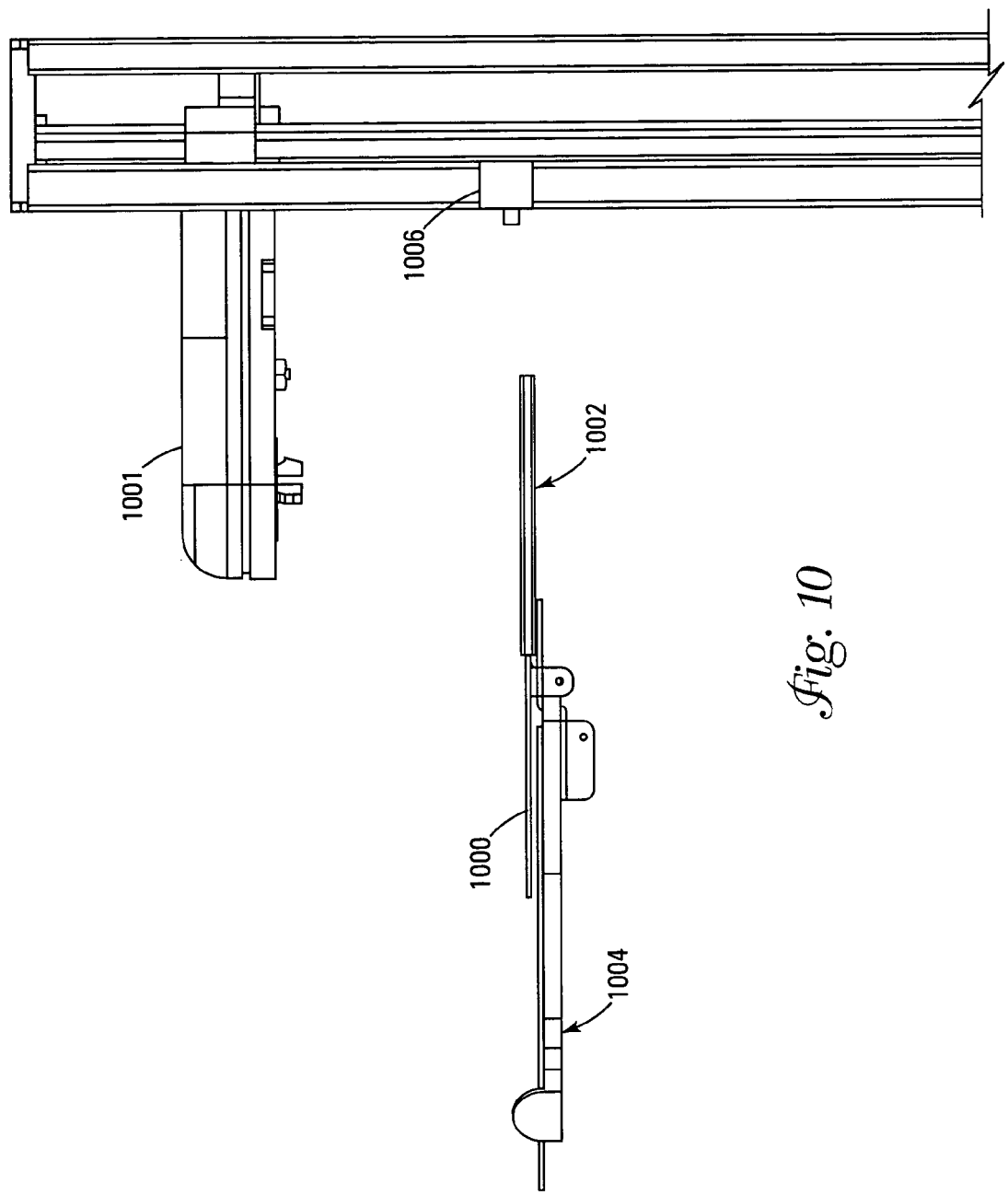

DISC COLLATOR

FIELD

The present invention relates generally to storage medium processing and in particular the present invention relates to a medium handler and organizer.

BACKGROUND

Compact discs are used as a storage medium for digital information. The data is stored on the compact disc by varying the optical characteristics of the disc. This digital information can be any type of data, such as, but not limed to, audio, image, photo and/or video information. In other words, the digital data stored on a compact disc can vary from disc to disc. Different types of compact discs can be provided, a traditional type of compact disc is manufactured using a plastic mold operation. Each compact disc manufactured using the same mold contains the same digital information. As such, large production runs of compact discs which contain the same information, such as a musical composition, are manufactured in an economical manner by using a molding process.

A different type of compact disc which is commercially available is a recordable compact disc. This type of disc is manufactured such that it does not contain data thereon, but can be programmed after it is manufactured. The optical characteristics, therefore, of the compact disc are modified after it is fabricated depending upon the data that is stored on the disc. In the context of the present invention, it is to be understood that reference to a compact disc (CD) includes and encompasses Compact Disc Recordable "CD-R", Compact Disc Readable "CD-RW", CD-ROM, CD-PROM, Digital Versatile Disc "DVD", DVD-R, DVD-RAM, DVD-RW, or any disc for data storage.

To identify the data stored on a compact disc, a label is often printed on one side of the compact disc. For large manufacturing runs of a common compact disc, a silk screen process is often used to apply the label to the compact disc. For small production runs of compact discs, such as those using recordable compact discs, a silk screen operation may not be economical. A custom printing operation, therefore, can be employed to print a custom label on each compact disc. See for example U.S. Pat. No. 5,734,629 entitled "CD Transporter" issued Mar. 31, 1988 for a description of a compact disc transporter which can be used to move a compact disc between a data recorder and a printer, and which allows for automated processing of recordable compact discs. This transporter moves a single compact disc at a time between stations and places completed compact discs in a stack.

While organization of printed and recorded CDs has been addressed before, a quick and easy system for organization of multiple versions of CDs or of different CDs remains a labor intensive task, requiring a user to sort through a stack of discs, or to examine multiple trays that must be opened and examined.

For the reasons stated above, and for other reasons stated below which will become apparent to those skilled in the art upon reading and understanding the present specification, there is a need in the art for a system that increases the ability of a user to quickly retrieve printed CDs, and to automatically sort CDs according to a predefined structure.

SUMMARY

The above-mentioned problems with respect and other problems are addressed by the present invention and will be understood by reading and studying the following specification.

In one embodiment, a compact disc processing system includes a supply station for holding a plurality of blank compact discs, a printer for printing indicia on a compact disc, the printer including an extendable drawer adapted to receive the compact disc, a recorder for recording information on the compact disc, the recorder including an extendable drawer to receive the compact disc, a transporter carriage for holding and transporting the compact disc between drawers of the recorder and printer, the supply station, and a disc collator for collating CDs into discrete bins. While typical recorders, readers, and printers use extendable drawers as discussed, others do not. Instead, they may be partially disassembled models which do not use drawers, or may require manual operation of a drawer, or may not have a drawer at all, such as a system which accepts a disc by a gentle insertion partially into an opening, and ejects a disc in the reverse fashion. Each such recorder, while different, is amenable for use with various embodiments of the present invention.

In another embodiment, compact disc processing system includes a supply station for holding a plurality of blank compact discs, a printer for printing indicia on a compact disc, the printer including an extendable drawer adapted to receive the compact disc, a recorder for recording information on the compact disc, the recorder including an extendable drawer to receive the compact disc, a transporter carriage for holding and transporting the compact disc between drawers of the recorder and printer, the supply station, and a number of collators each having a stationary collating tray and a rotatable flipper tray, the flipper tray rotatable about a pivot point between the flipper tray and the collating tray.

In yet another embodiment, a compact disc processing system includes a supply station for holding a plurality of blank compact discs, a printer for printing indicia on a compact disc, the printer including an extendable drawer adapted to receive the compact disc, a recorder for recording information on the compact disc, the recorder including an extendable drawer to receive the compact disc, a transporter carriage for holding and transporting the compact disc between drawers of the recorder and printer, the supply station, and a number of collators each having a stationary collating tray and a rotatable flipper tray, the flipper tray rotatable about a pivot point between the flipper tray and the collating tray. The supply station, the extendable printer drawer, the extendable recorder drawer, and the flipper trays are aligned along an axis with the transporter carriage. The transporter carriage moves along the axis only.

In yet another embodiment, a method of collating CDs in a CD processing system includes sorting CDs into discrete bins based on predefined criteria for sorting discs.

In still another embodiment, a method of collating CDs in a system includes picking a CD to be sorted with a picker, raising the CD through at least one layer of a flipper tray collator until the CD is above a desired one of a plurality of collator trays, lowering the CD to just above the tray, and depositing the CD into the selected tray.

Other embodiments are described and claimed.

BRIEF DESCRIPTION OF DRAWINGS

FIG. 3 is a side elevation view of a portion of a CD collator embodiment;

FIGS. 4, 5, 6, and 7 are side views of one embodiment of a process for depositing a disc in a collator;

FIG. 8 is a side view of a stack of collators;

FIG. 9 is a side elevation view of a system according to another embodiment of the present invention; and FIG. 10 is a side elevation view of another system according to yet another embodiment of the present invention.

DETAILED DESCRIPTION

Figure 1:
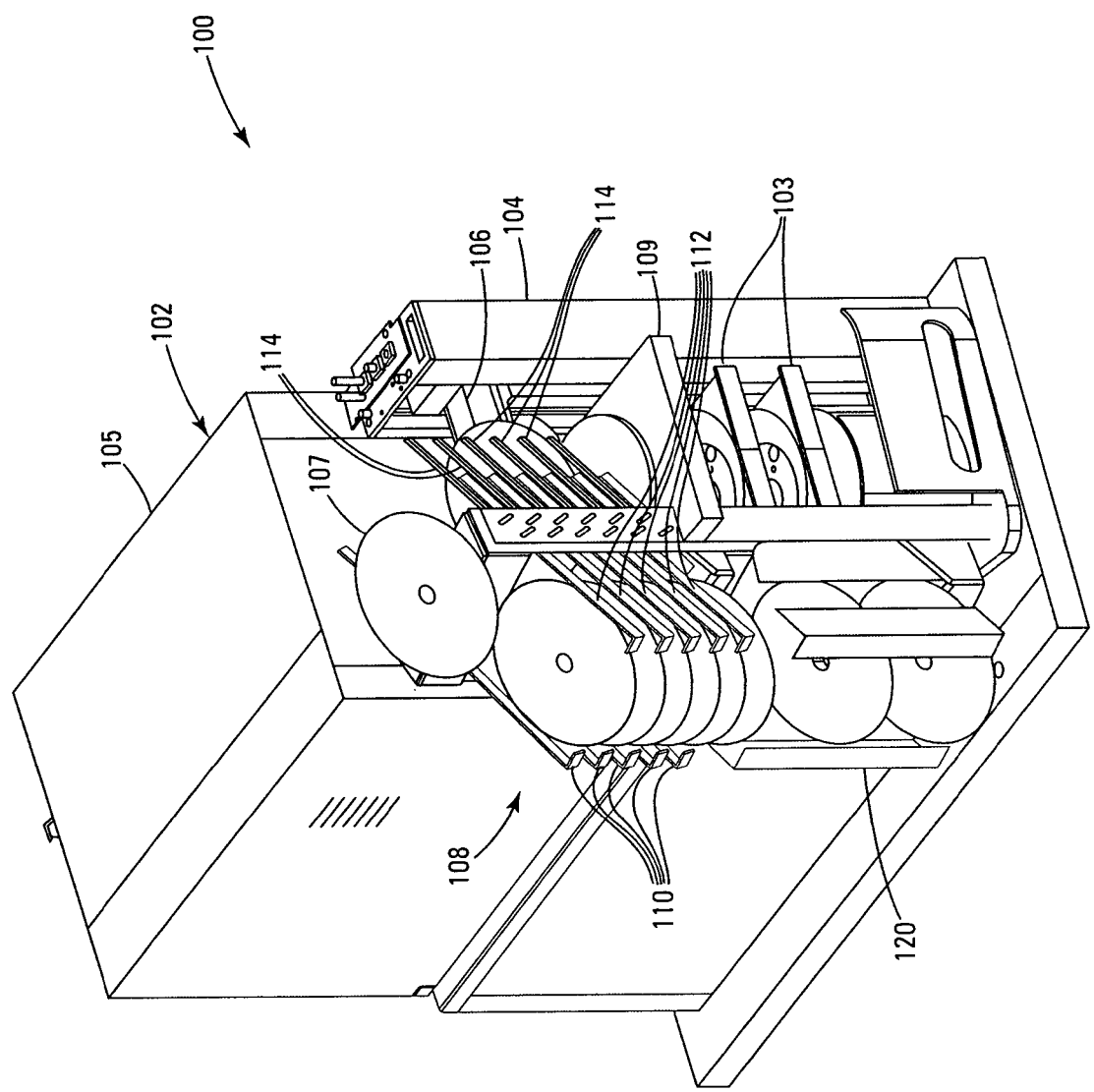
FIG. 1 is an isometric view of a system according to one embodiment of the present invention.

In the following detailed description of the invention, reference is made to the accompanying drawings that form a part hereof, and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention.

The following detailed description is, therefore, not to be taken in a limiting sense, and the scope of the present invention is defined only by the appended claims, along with the full scope of equivalents to which such claims are entitled.

The various embodiments of the present invention have the capability to deliver CDs into discrete bins instead of a large common output bin, thus allowing for easy retrieval by a user. This is accomplished in various embodiments by moving the CD in a vertical motion via a picker which hinges a flipper tray up until it clears the CD. The flipper tray then drops to its normal position and the picker moves down to place the CD on the flipper tray. The picker then moves vertically up to allow the CD to slide into the selected collating tray. Further embodiments use motion of the picker arm in more than one axis to deposit CDs in discrete bins of other configurations.

Referring to FIG. 1, a simplified block diagram is illustrated of one embodiment of a compact disc handler 100 of the present invention. The block diagram is provided to help understand the relationship of components in embodiments of the invention, and a detailed description of embodiments of the components are described below. The compact disc handler includes a body or housing 102 containing at least one compact disc recording device 103, a printer 105, with printer tray 109, for printing label-type information on a compact disc, a transporter device including an elevator 104 and a pickup arm, or picker, 106, for moving compact discs such as disc 107, and a collator stack 108. Collator stack 108 comprises in one embodiment a plurality of individual collators 110, each collator comprising a collating tray 112 and a flipper tray 114. The recorder can be any type of commercially available recorder intended to record data on an optically readable medium, such as a compact disc. Further, in some embodiments, a recorder is replaced with a reader only, when recording is not necessary. Likewise, the printer can be any type of printer intended to print information or images on a compact disc. The printer can operate using any known printing method, such as but not limited to thermal transfer, ink jet or laser printing. Still further, in some embodiments, only a single element, such as a printer alone, a recorder alone, or a reader alone, or combinations of multiple elements, are used in the system.

Figure 2:
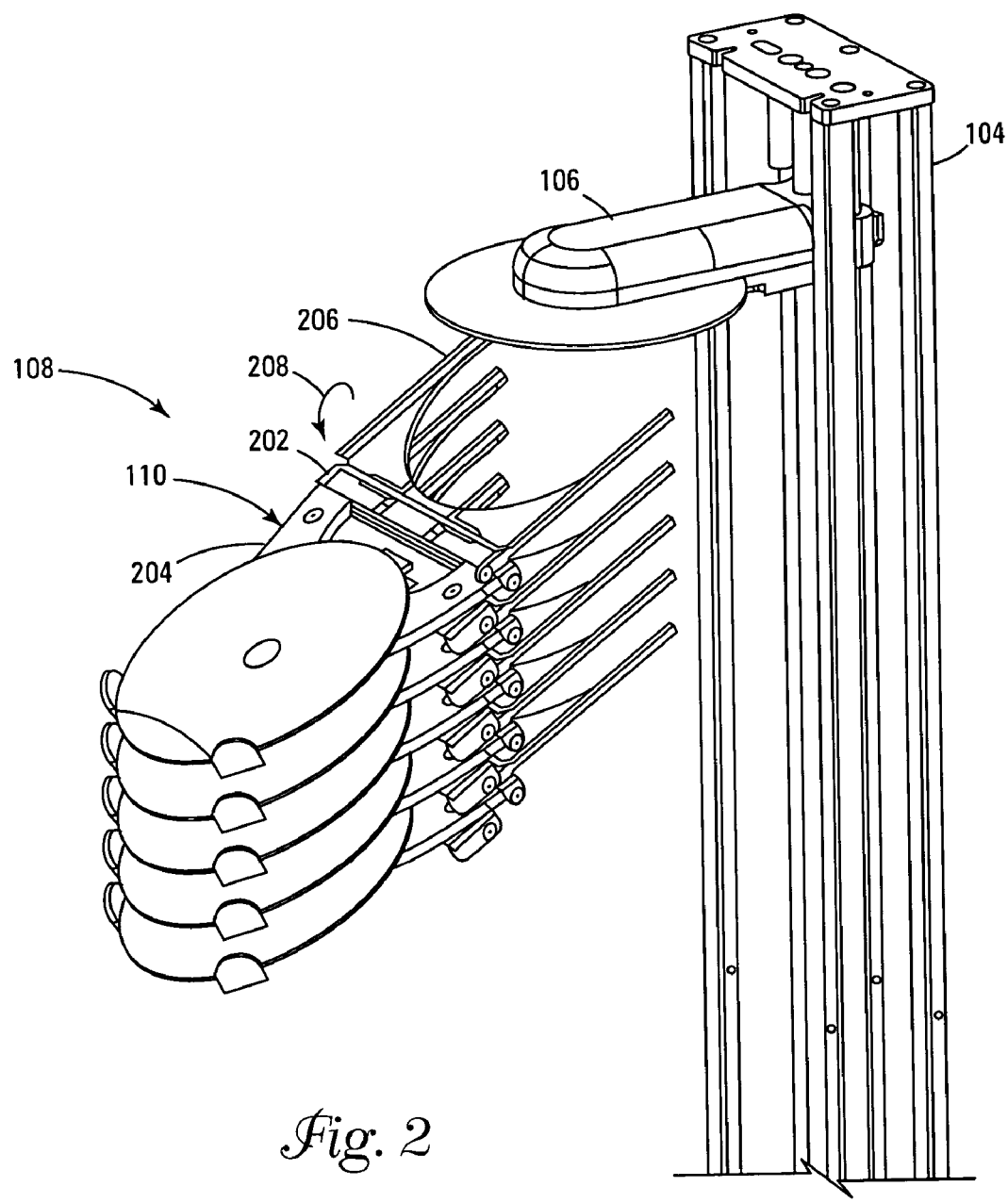
FIG. 2 is a more detailed view of a CD collator of FIG. 1.

In one embodiment, the pickup arm is coupled to the elevator to allow the pickup arm to move in a vertical direction during operation. As such, the transporter mechanism includes a motor to provide vertical movement to the pickup arm. In one embodiment, the vertical motion is the only axial motion of the picker arm. The drawers for the printer and any recorders, as well as the collator stack and a CD supply stack, are all coaxial along an axis centered substantially vertically on the gripper 311 of the picker arm (as is best shown at 311 of FIG. 3). As illustrated in FIG. 2, this allows the gripping head to be vertically aligned with the drawers of the printer and recorders, and also vertically aligned with the compact disc collators and a supply stack of discs. In alternate embodiments, different gear structures can be used, including a belt and pulley configuration.

In other embodiments, motion in multiple or different directions are options. For example, in another embodiment, the elevator can be formed with a concentric interior and exterior shafts that engage the pickup arm. The interior shaft is rotated to either raise or lower the pickup arm, and the exterior shaft is rotated to rotate the pickup arm through a horizontal plane around an axis of the vertically extending shaft. In another embodiment, motion of the picker arm is in a horizontal plane, and collators as well as drawers for recorders and printers are in the arc of angular motion of the picker arm. It should be understood that different configurations involving motion in one or more directions on one or more axes are contemplated, and are therefore with in the scope of the present invention.

The collators 110 are shown in greater detail in FIGS. 2 and 3, as described below. FIG. 2 shows a collator stack such as stack 108 described above. Each collator 110, as has been mentioned, comprises a collating tray and a flipper tray. The collating tray is a stationary tray that holds discs, such as CDs, CD-Rs, CD-RWs, DVDs, DVD-Rs, DVD-RWs, and the like when they have been transferred from the picker into the collating stack 108. Each collator's flipper tray is rotatable on a hinge axle or other pivot point 202, which is at the connection between its collating tray 204 and flipper tray 206. The flipper tray is freely rotatable about the hinge in a direction shown as arrow 208. In its rest position as shown, the collator has its flipper tray 206 and collating tray 204 separated by an angle of 180 degrees. As the flipper tray is rotated by the contact with a disc as described above, the flipper tray rotates about an angle along the line indicated at arrow 208. The rotation of the flipper tray is only so far as to allow the disc to pass above the arc of the flipper tray before the disc and the flipper tray disengage and the flipper tray pivots back to its rest position.

FIG. 3 is a side view of a single collator 300. Collator 300 comprises in this embodiment a stationary collating tray 302 and a flipper tray 304. The collating tray 302 and the flipper tray 304 are joined into the collator 300 at a pivot point 306, about which the flipper tray can rotate in a direction shown as arrow 308 when a disc is moved by the picker 310 through the space occupied by the flipper tray. This process is described in greater detail below with respect to FIGS. 4 through 6. Each stationary collating tray 302 can hold a number of discs. The disc holding arms 312 hold discs that slide into the collating tray 302 after being deposited on the flipper tray by the picker 310.

In operation, a collating process is shown in greater detail in FIGS. 4 through 7. In brief, the collating process comprises picker 402 retrieving a disc 404 from a printer, a CD writer, or a stack of discs, raising the disc using the elevator 408 to a point at which a desired collating tray has been selected as will be described below, lowering the picker 402 to rest the disc 404 very close to the flipper tray 412 of the selected collator 410, releasing the disc 404, and raising the picker 402 so that the disc 404 slides from the selected flipper tray 412 to the stationary collating tray 414 associated with the flipper tray 412.

FIG. 4 is an in-process side elevation view of the elevator 408, picker 402 holding a disc 404, and collator 410. The collator comprises a stationary collating tray 414 and a movable flipper tray 412 which is hingedly connected to the stationary collating tray 414 at pivot point 416 by a suitable hinge, joint, or the like. It should be understood that any joint permitting the motion of the flipper tray from an orientation separated by substantially 180 degrees from the collating tray to an orientation in which the angle subtended between the collating tray and the flipper tray is less than 180 degrees is sufficient for the purposes of the invention, and is within the scope of the invention. For example, a pin may be used to connect the collating tray and the flipper tray, or the collating tray may be hinged to the flipper tray, without departing from the scope of the invention. It will be understood by those of skill in the art that the rotatable connection between the collating tray and the flipper tray may be accomplished in any of a number of ways without departing from the scope of the invention.

The disc 404 held by the picker 402 contacts the bottom 418 of flipper tray 412 of the collator 410 as the picker 402 is raised on the elevator 408. Each flipper tray 412 is positioned so that when the picker 402, loaded with a disc 404, is raised to the point where the disc contacts the bottom 418 of the flipper tray 412, the disc 404 contacts the flipper tray, and causes it to rotate about pivot point 416 in the direction of arrow 420 if the picker moves any further in the vertical direction. As the picker moves to an elevation above that of the flipper tray, the flipper tray rotates under the force provided by the contact between the disc carried by the picker and the flipper tray.

When the particular collator 410 that is shown in FIG. 4 is to be the receptacle for the disc held by the picker, the elevator raises the picker to an elevation suitable for the disc and the flipper tray to disengage, and the flipper tray pivots back to its normal position as shown in FIG. 5. At this point, the picker and disc are above the flipper tray. The picker is lowered to a point at which the disc is positioned just above the upper surface 420 of the flipper tray 412 as is shown in FIG. 6. At this point, the picker releases the disc. The close proximity of the picker and the flipper tray do not allow the disc to slide down the flipper tray into the collating tray until the picker moves up again to clear the disc, as is shown in FIG. 7. In FIG. 7, the disc rotates to the same angle as the flipper tray and collating tray, and slides by gravitational force down the flipper tray into the collating tray. The disc is retained in the collating tray by suitable tray arms such as arms 422 shown in FIG. 7. At this point, the picker is free to return to retrieve another disc from a printer, CD-writer, or stack, and to repeat the process.

In another embodiment, in which the collators are further spaced apart in a vertical direction, the picker arm can release a disc at a greater distance from the flipper tray without requiring a very close proximity between the disc and the flipper tray. For example, referring to FIG. 5, the disc 404 could be released at the location of the picker 402 shown therein. In that embodiment, the disc 404 falls to the flipper tray 412 and is moved by gravity to the respective collating tray.

As it has been shown with respect to FIGS. 4 through 7, once the disc held by the picker arm loses contact with a respective flipper arm, the flipper arm pivots back to its rest position. Once this pivoting occurs, in the embodiment described above, the disc cannot be returned to below the collator assembly. In another embodiment, the flipper trays are equipped with a breakaway feature that allows each individual flipper tray to be dislodged from its collator without damaging the collator, if the picker arm is lowered without releasing the disc, while allowing the disc to pass back through in a downward vertical motion. This is helpful in circumstances where a malfunction occurs with the picker arm or gripper, or the like.

In one embodiment, multiple collating trays are arranged in substantially vertical orientation in a stack of a system 800 as is best shown in FIG. 8. The elevator 802 has a picker 804 movable thereon. The picker 804 picks up a disc from a printer, CD-writer, or stack, and moves upward until the disc contacts the lowermost collator 806. The picker position with respect to the collating trays is known by a command module for the system and associated circuitry for monitoring the position of the picker, and the positions at which each collating tray are selected by the picker are also known. For example, suppose a disc picked up by the picker is to be deposited into collator 810. The picker 804 is raised to a point where collators 806, 808, and 810 have been contacted by a disc held on the picker 804, and until a position at which it is known that flipper trays 818, 820, and 822 of collators 806, 808, and 810 respectively have contacted the disc, have rotated upward, and lost contact with the disc to pivot back to their normal, at-rest, positions, as described in more detail above with respect to FIGS. 4 and 5. The picker is lowered to a point where the disc is just above or in another embodiment is in contact with the flipper tray 822 of collator 810, and the disc is released. The picker is raised above the point at which the disc is released, and the disc rotates to the normal angle of the flipper tray and slides by the force of gravity into the collating tray 824 of collator 810, as described in more detail above with respect to FIGS. 6 and 7.

While a stacked series of collators has been described above, it should also be understood that other configurations for collators, including stacks arranged around an angular motion of the picker arm, as well as other discrete bins such as on a carousel or the like, are also within the scope of the invention. Many configurations will be evident to those of skill in the art given the ability of picker arms to move in multiple directions, including motion along one, two, three, or even more axes. Further, instead of placing discs in trays or collators that constrain by the outer diameter of the disc, a constraint by inner diameter of the disc is used in other embodiments. For example, when a disc is deposited on a flipper tray, the disc in one embodiment slides to a collating tray and drops onto a spindle which constrains the disc by the opening in the middle of the disc, or by its inner diameter.

In another embodiment, a single collator is used. The single collator system 900, as shown in FIG. 9, comprises a picker arm 902 on elevator 903, a flipper tray 904 rotatable about a pivot point 906 when the picker arm moves in a vertical direction loaded with a disc as described above, and an output bin 908 for holding discs such as discs 910. When the picker arm moves a disc above the flipper tray 904, and subsequently releases the disc, the disc falls into the flipper tray, and is deposited in the output bin 908. In this embodiment, only one motor is used. The motion of the picker arm is along one axis parallel to the gripper head assembly 912. The axis is indicated by dashed line 914. Of course, in other embodiments, multiple motors are used and the picker arm can move in multiple directions. However, the simple nature of single axis motion allows the system 900 to be reduced in complexity to provide a single axis, single motor CD processing system with a large output bin. Similarly, the system 900 is in another embodiment combined with a collator stack such as those described herein specifically with respect to FIGS. 1, 2, and 8 without departing from the scope of the invention.

In another embodiment shown in FIG. 10, each of the collators is horizontal with respect to the axis of motion of the picker arm 1001. In this embodiment, gravity is not sufficient to force a disc 1000 deposited into a flipper tray 1002 into its respective collating tray 1004. In this embodiment, an actuator 1006 is used to move the disc 1000 into the collating tray 1004. The actuator can take many forms, including by way of example only and not by way of limitation, a mechanical arm that extends to push the disc into the collating tray, a gripper or other moving element on the picker arm that pushes the disc into the collating tray, a gang actuator element that extends from the elevator or the picker arm to push the disc or multiple discs in multiple collators into their respective collating trays, or the like.

In this fashion, any number of collators can be stacked in a system such as system 100, 800, 900, or 1000 without departing from the scope of the invention. The number of collators is limited only by the desired storage capacity for each of the collators, and the desired physical characteristics of the system, such as height.

In another embodiment, a large run tray is provided below the smaller collators. This large run tray in one embodiment holds a much larger quantity of discs than the collators. The large run tray is used for jobs that have a large number of discs that are to be made, printed, or the like. This large tray is shown in more detail as element 120 in FIG. 1 as well as element 908 in FIG. 9.

In various embodiments, the collators are labeled for easy retrieval of discs. For example, in a large run of discs, it may be desirable to run a small set of discs before completing the large run. This could be for any number of reasons, such as a rush job or the like. With the embodiments of the present invention, it is an easy task to cause the system to print the small run of discs and to deposit the completed small run of discs into one of the collators not being used for the main run.

Further, CDs can be presented within the trays in such a way to expose unique and pertinent printed information (for example name, job number, barcode or the like) and thus allow for easy CD identification.

The collating system of the present invention embodiments is suitable for use on any number of devices, such as those found in U.S. Pat. Nos. 5,734,629, which are hereby incorporated by reference in their entireties herein. Further, it should be understood that the type of picker used in the embodiments of the present invention may be varied without departing from the scope of the invention. Examples of such pickers include, but are not limited to, inner diameter pickers, outer diameter pickers, vacuum pickers, and the like.

CONCLUSION

A CD collator has been described that includes a series of collating trays, each tray selectable for depositing a CD therein according to a predefined scheme. The collator comprises a series of trays, each tray having a rotatable portion and a stationary portion. The rotating portion rotates as a disc is raised through the level of the tray, and then pivots back to its normal position when the disc clears the tray. At that point, the disc can be dropped into the tray. In this fashion, a disc can be deposited in any of a number of trays according to where a user desires the disc to be placed. This collating feature allows for prompt and timely retrieval of CDs. It also reduces the need to search through a entire stack CDs to find the desired CDs, as the desired CDs are sorted by user preference.

A single axis of motion CD processing system has also been described in which the picker arm moves in one axis only, and all components of the processing system have drawers, bins, or the like on the axis of motion. Such a system requires only one motor. Collating a number of discrete bins is accomplished in this embodiment without the need for extra motors or actuators. The mechanical operation of the flipper trays and collating trays allows the existing motors and actuators of a system, as well as the picker, to be used without substantial modification.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed:

1. A compact disc processing system, comprising:
   a supply station for holding a plurality of blank compact discs;
   a printer for printing indicia on a compact disc, the printer including an extendable drawer adapted to receive the compact disc;
   a recorder for recording information on the compact disc, the recorder including an extendable drawer to receive the compact disc;
   a transporter carriage for holding and transporting the compact disc between drawers of the recorder and printer, the supply station, and
   a disc collator for collating CDs into discrete bins;
   wherein the disc collator comprises:
      a stationary collating tray; and
      a rotatable flipper tray, the flipper tray rotatable about a pivot point between the flipper tray and the collating tray.

2. The compact disc processing system of claim 1, wherein the collating tray and flipper tray are angled to allow a disc placed in the flipper tray to slide by gravitational force into the collating tray.

3. The compact disc processing system of claim 1, and further comprising:
   a second disc collator for collating CDs into the discrete bins.

4. The compact disc processing system of claim 3, wherein the second disc collator comprises:
   a second stationary collating tray; and
   a second rotatable flipper tray, the second flipper tray rotatable about a second pivot point between the second flipper tray and the second collating tray.

5. The compact disc processing system of claim 4, wherein the second collating tray and second flipper tray are angled to allow a disc placed in the second flipper tray to slide by gravitational force into the second collating tray.

6. The compact disc processing system of claim 1, wherein the supply station, the printer drawer, and the flipper tray are aligned along an axis with the transporter carriage, and wherein the transporter carriage moves along the axis only.

7. The compact disc processing system of claim 1, wherein the supply station, the printer drawer, and the flipper tray are arranged in position along a substantially horizontal arc of travel of the transporter carriage.

8. The compact disc processing system of claim 1, wherein the disc collator further comprises:
   a plurality of further stationary collating trays; and
   a plurality of further rotatable flipper trays, each rotatable flipper tray rotatable about a pivot point between the flipper tray and its respective stationary collating tray; and
wherein the stationary collating trays are arranged substantially vertically in a stack having a common axis, and wherein the flipper trays are arranged substantially vertically in a stack having a common axis.

9. A compact disc processing system, comprising:
   a supply station for holding a plurality of blank compact discs;
   a printer for printing indicia on a compact disc, the printer including an extendable drawer adapted to receive the compact disc;
   a recorder for recording information on the compact disc, the recorder including an extendable drawer to receive the compact disc;
   a transporter carriage for holding and transporting the compact disc between drawers of the recorder and printer, the supply station, and
   a plurality of collators, each collator comprising a stationary collating tray and a rotatable flipper tray, the flipper tray rotatable about a pivot point between the flipper tray and the collating tray.

10. The compact disc processing system of claim 9, wherein each of the plurality of collating trays and flipper trays are angled to allow a disc placed in their respective flipper trays to slide by gravitational force into their respective collating trays.

11. The compact disc processing system of claim 10, wherein each angled placement of the collating tray and flipper tray is such that the flipper tray extends upward from the pivot axis and the collating tray extends downward from the pivot axis.

12. The compact disc processing system of claim 9, wherein each of the plurality of collating trays is arranged in a stack substantially vertically along a common axis.

13. The compact disc processing system of claim 12, wherein the supply station and the extendable printer drawer are aligned with the flipper trays on the common axis.

14. The compact disc processing system of claim 12, wherein the supply station, the printer drawer, and the collator stack are arranged in position along a substantially horizontal arc of travel of the transporter carriage.

15. A compact disc processing system, comprising:
   a supply station for holding a plurality of blank compact discs;
   a printer for printing indicia on a compact disc, the printer including an extendable drawer adapted to receive the compact disc;
   a recorder for recording information on the compact disc, the recorder including an extendable drawer to receive the compact disc;
   a transporter carriage for holding and transporting the compact disc between drawers of the recorder and printer, the supply station, and
   a plurality of collators, each collator comprising a stationary collating tray and a rotatable flipper tray, the flipper tray rotatable about a pivot point between the flipper tray and the collating tray; and
wherein the supply station, the extendable printer drawer, the extendable recorder drawer, and the flipper trays are aligned along an axis with the transporter carriage, and wherein the transporter carnage moves along the axis only.

16. The compact disc processing system of claim 15, wherein each of the plurality of collating trays is arranged in a stack substantially vertically along a common axis.

17. A collator for a CD processing system, comprising:
   a plurality of collator trays, each collator tray comprising:
      a stationary collating tray; and
      a rotatable flipper tray, the flipper tray rotatable about a pivot point between the flipper tray and the collating tray.

18. The collator of claim 17, and further comprising:
   a large capacity output bin.

19. The collator of claim 17, wherein the collator trays are arranged in a substantially vertical stack.

20. A compact disc collator, comprising:
   a plurality of collator trays arranged in a substantially vertical stack along a common axis, each collator tray comprising:
      a stationary collating tray; and
      a flipper tray attached to the collating tray, the flipper tray rotatable about a pivot axis between the collating tray and the flipper tray.

21. The compact disc collator of claim 20, wherein each collator tray is positioned at an angle such that the flipper tray extends upward from the pivot axis and the collating tray extends downward from the pivot axis.

* * * * *